United States Patent Office 3,374,282
Patented Mar. 19, 1968

3,374,282
METHOD OF PREPARING AROMATIC HYDROCARBONS FROM PROPYLENE HYDROCARBONS
Frederick J. Soderquist, Essexville, Harold D. Boyce, Coleman, and Edward P. Duris, Midland, Mich., assignors to The Dow Chemical Company, Midland, Mich., a corporation of Delaware
No Drawing. Filed Feb. 1, 1967, Ser. No. 613,104
7 Claims. (Cl. 260—673.5)

ABSTRACT OF THE DISCLOSURE

A process for converting propylene to aromatic hydrocarbons by conducting a mixture of a gaseous diluent, such as, for example, steam, and polypropylene hydrocarbons through a reaction zone maintained at a temperature range of from about 700° to about 950° C., and separating the resultant aromatic hydrocarbons from the hydrocarbon product phase.

Background of the invention

Propylene is derived as a by-product from many petrochemical processes, for example, practically all olefin plants produce excess quantities of propylene. Propylene is an extremely poor recycle stock for ethylene production and although there is an increasing absorption of propylene by polypropylene and detergent markets, there still exists a great excess of propylene on the market. It has now been discovered that by a novel sequence of processing steps it is possible to convert propylene to valuable aromatic hydrocarbons, such as benzene, toluene, naphthalene and other like aromatic hydrocarbons.

Summary of the invention

It is a principal object of the present invention to produce highly stable aromatic hydrocarbons directly from propylene hydrocarbons readily obtained from petrochemical processes.

The invention, as well as additional objects and advantages thereof, will become readily apparent from a reading of the detailed description presented hereinafter.

The term "space velocity" as used herein designates grams of polypropylene hydrocarbons per unit volume of reaction zone, in milliliters, per hour.

"Polypropylene hydrocarbons" as herein employed, designates dimers, trimers, tetramers and other like low molecular weight polymers consisting of recurring structural units of propylene.

In accordance with the present invention propylene is first polymerized to form a mixture of polypropylene hydrocarbons. Unreacted monomeric propylene is separated from the polypropylene hydrocarbon mixture. Usually a mixture of at least one polypropylene hydrocarbon and a gaseous diluent is conducted through a reaction zone maintained at an elevated temperature of from about 700° to about 950° C. whereupon the polypropylene hydrocarbons are converted to highly stable aromatic hydrocarbons. The aromatic hydrocarbons are separated from the product hydrocarbon phase by such standard techniques as distillation, crystallization, or absorption, and unreacted polypropylene hydrocarbons are generally recycled through the process. The initial polymerization step may be by-passed if polypropylene hydrocarbons are available as feed stock. It has been discovered in accordance with this invention that the diluent present efficiently prevents the formation of tars and carbonaceous material which heretofore have been associated with high temperature treatment of polypropylene hydrocarbons.

Description of the preferred embodiment

Usually in the practice of the present invention propylene is polymerized to relatively low molecular weight polypropylenes by a number of known techniques such as, for example, passing a stream of propylene over an acid type solid catalyst such as silica-alumina, trialkyl alumina or other like catalysts at elevated temperatures and pressures. A mixture of polypropylene hydrocarbons containing, for example, the dimer, trimer, and tetramers of propylene are separated from unreacted propylene by conventional separation methods such as distillation. Usually unreacted propylene is recycled through the polymerization step.

The mixtures of polypropylene hydrocarbons may be processed as a mixture or may be further fractionated and the fractions processed separately.

One or more of the polypropylene hydrocarbons are passed through a reaction zone maintained at about 700° to about 950° C. concurrently with a substantially equal weight of a gaseous diluent which is substantially inert to the reactants and reaction products at the reaction conditions, such as, for example, steam, at a flow rate sufficient to assure conversion of polypropylene hydrocarbons to aromatic hydrocarbons. When a source of polypropylene hydrocarbons is available they need only be conducted through the reaction zone at the conditions set forth herein to convert them to aromatic hydrocarbons.

The effluent vapors from the reaction zone are cooled and condensed and the aromatic hydrocarbons produced are isolated from the product hydrocarbon phase by conventional separation methods; unreacted polypropylene hydrocarbons generally are recycled through the reaction zone at the designated temperature range and flow rate.

Propylene may be conducted directly through the reaction zone under the operating conditions set forth herein. However, yield rates are low and the process is much more efficient when polypropylene hydrocarbons are conducted through the reaction zone.

It has been found that some isomers of the propylene dimer produce markedly higher yields of aromatics than others. For example, 2-methyl-2-pentene was found to produce higher yields of aromatic hydrocarbons than 2-methyl-1-pentene. Therefore, as an additional step the propylene dimers may be separated from the product mixture produced in the polymerization step and then further processed to produce the favorable dimer compound. The isomerization of the propylene dimer may be carried out by any one of several known methods such as, for example, contacting the 2-methyl-1-pentene dimer compound with an acid type catalyst at an elevated temperature.

The process as described herein is normally run at atmospheric pressure but it can be carried out at higher or lower pressures.

The reaction zone temperature can be varied within designated ranges, as indicated. The reaction zone ordinarily is maintained within a range of from about 700° to about 950° C. The system is less efficient at temperatures lower than about 700° C. in the reaction zone and greater proportions of polypropylene hydrocarbons must be recycled through the zone. Temperatures greater than about 950° C. cause degradation of the polypropylene hydrocarbons and of the aromatic hydrocarbons produced. The most favorable temperature associated with the second reaction zone is about 900° C.

The flow rate, defined as a space velocity of the polypropylene hydrocarbons, varies in accordance with the dimensions of the reaction zone. It has been found that a space velocity of from about 0.1 to 2.0 grams polypropylene hydrocarbons per milliliter reactor volume per hour is operable. A space velocity of approximately 0.6 gm./ml./hr. is preferred. Lower space velocities cause plugging of the reaction apparatus while higher velocities produce a less efficient yield rate.

The presence of a diluent is necessary to avoid carbonization and tar formation. Examples of suitable diluents are steam, nitrogen, carbon dioxide, argon, aliphatic hydrocarbons, aromatic hydrocarbons, and the like which are substantially inert to the reactants and reactant products during operation of the processes. The proportion of diluent to initial polypropylene hydrocarons is expressed in the weight of diluent to the weight of feed stock. A proportion of one to one has been observed to produce the maximum economical limit but higher ratios are operable. Proportions of lower than 1:1 can be used. However, proportions lower than 0.2:1 cause excessive plugging. A proportion of from about 0.5:1, to about 1:1 (steam to polypropylene) is preferred in the actual operation of the process. The preferred proportion will vary somewhat accordingly with the gaseous diluent employed.

Benzene, naphthalene and toluene are the principal aromatics produced in the operation of the present invention along with indene and minor amounts of other substituted aromatic hydrocarbons.

The method of the present invention can be run as a continuous operation with a means for recycling unreacted polypropylene hydrocarbon or as a batch-type operation, and as indicated, the polymerization step is not required when the feed stock consists primarily of polypropylene hydrocarbons. The following examples further illustrate the utility and operation of the present invention. They are included herein to aid in understanding the present invention and are not meant to limit the scope of the invention to the specific examples enumerated.

controlling potentiometer connected to strategically located thermocouples within the reactor. By periodically resetting the potentiometer controller a series of successive temperature levels was obtained ranging from 700° to 900° C. in 50° C. steps.

A conventional water cooled condensing system was used to recover the liquid product. Gaseous materials not condensed in this apparatus were sampled at each temperature level and the balance metered and vented. These samples were analyzed by mass spectrometry. The liquid hydrocarbon products were collected at each temperature level and analyzed for aromatics by infrared methods. Recovered steam condensate was discarded. By utilizing these analyses and the metered product gas volumes, the aromatics produced at each temperature level were calculated and are presented in following Table I. The aromatics produced are expressed as pounds of each aromatic per 100 pounds of hydrocarbon fed. Total aromatics are also tabulated, expressed in the same terms. It can be observed from the data that single pass yields of as high as 34 pounds of total aromatics per 100 pounds of tetrapropylene fed were obtained.

TABLE I

| Feed Stock | Operating Temp., °C. | Percent Liquid Recovery | Pounds Produced per 100 pounds Feedstock | | | | | | | | | | | Total Aromatics, lb./100 lb. feed |
|---|---|---|---|---|---|---|---|---|---|---|---|---|---|---|
| | | | Liquid Phase | | | | | | | | | Gas Phase | | |
| | | | Benz. | Tol. | m-Xylene | p-Xylene | o-Xylene | Styrene | Indene | Naphthalene | β-Methyl naphthalene | Benz. | Tol. | |
| Tetrapropylene. | 700 | 33.18 | 2.65 | 5.26 | 1.66 | 0.50 | 0.66 | | | 0.33 | | 0.96 | 0.24 | 12.26 |
| | 750 | 27.95 | 3.63 | 5.87 | 1.68 | 0.56 | 1.12 | 1.40 | | 0.84 | | 2.04 | 0.36 | 17.50 |
| | 800 | 32.17 | 6.43 | 6.11 | | | | 4.18 | 2.73 | 2.57 | 1.29 | 3.99 | 0.78 | 28.08 |
| | 850 | 35.94 | 5.75 | 5.39 | | | | 4.67 | 3.59 | 5.21 | 1.98 | 4.88 | 0.66 | 32.13 |
| | 900 | 39.38 | 5.91 | 3.15 | | | | 3.54 | 3.94 | 7.88 | 3.15 | 6.06 | 0.66 | 34.29 |

Example 1

Commercial tetrapropylene was passed with steam into a preheat and vaporizing zone, and thence into a high temperature reactor. Feed rates of tetrapropylene and steam were 49.1 and 50.2 grams per hour, respectively. The reactor volume was such that the space velocity obtained was 0.562 gram of hydrocarbon per milliliter of reactor volume per hour. Heat was supplied to the reactor by suitable electric heaters, and the temperature was controlled at the desired level by means of a

Example 2

A commercial tripropylene fraction was processed in essentially the same manner as that described in Example 1. Feed rates in this instance were 50.0 grams of tripropylene and 50.6 grams of steam per hour, calculating to a space velocity of 0.572 gram of tripropylene per milliliter reaction volume per hour. Calculated results are tabulated in following Table II. Again optimum single pass yields of about 34 pounds of aromatics per 100 pounds of tripropylene feed stock were obtained.

TABLE II

| Feed Stock | Operating Temp., °C. | Percent Liquid Recovery | Pounds Produced per 100 pounds Feedstock | | | | | | | | | | | Total Aromatics, lb./100 lb. feed |
|---|---|---|---|---|---|---|---|---|---|---|---|---|---|---|
| | | | Liquid Phase | | | | | | | | | Gas Phase | | |
| | | | Benz. | Tol. | m-Xylene | p-Xylene | o-Xylene | Styrene | Indene | Naphthalene | β-Methyl naphthalene | Benz. | Tol. | |
| Tripropylene. | 700 | 35.89 | 2.87 | 3.59 | 0.72 | 0.36 | 0.72 | | | 0.36 | | 0.51 | 0.09 | 9.22 |
| | 750 | 30.78 | 5.23 | 6.16 | 1.85 | 0.62 | 1.23 | 1.54 | | 1.08 | 0.62 | 1.63 | 0.26 | 20.22 |
| | 800 | 31.74 | 5.71 | 5.71 | | | | 3.49 | 2.06 | 2.70 | 0.95 | 3.91 | 0.72 | 25.25 |
| | 850 | 35.94 | 4.67 | 5.03 | | | | 3.95 | 3.23 | 5.57 | 1.98 | 4.54 | 0.45 | 29.42 |
| | 900 | 41.78 | 5.85 | 4.18 | | | | 4.18 | 3.55 | 7.52 | 2.30 | 5.79 | 0.55 | 33.92 |

Example 3

A single isomer propylene dimer, 2-methyl-2-pentene was isolated from the commercial dimer and employed as feed for this example. Processing conditions were similar to those employed in the previous Example 1. Feed rates were 44.4 grams of 2-methyl-2-pentene and 50.7 grams of steam per hour. Calculated space velocity was 0.508. Data and results are tabulated following in Table III. Optimum single pass yields of aromatics of approximately 44 pounds per 100 pounds of 2-methyl-2-pentene feed stock were obtained.

TABLE III

| Feed Stock | Operating Temp., °C. | Percent Liquid Recovery | Pounds Produced per 100 pounds Feedstock | | | | | | | | | | Total Aromatics, lb./100 lb. feed |
|---|---|---|---|---|---|---|---|---|---|---|---|---|---|
| | | | Liquid Phase | | | | | | | | Gas Phase | | |
| | | | Benz. | Tol. | m-Xylene | p-Xylene | o-Xylene | Styrene | Indene | Naphthalene | p-Methyl naphthalene | Benz. | Tol. | |
| 2-methyl-2-pentene. | 700 | 38.00 | 1.33 | 2.85 | | | | | | | | 0.39 | 0.10 | 4.67 |
| | 750 | 26.62 | 5.32 | 5.59 | | | | | | | | 3.00 | 0.73 | 14.64 |
| | 800 | 37.39 | 8.79 | 8.22 | | | | 4.49 | 2.62 | 3.55 | 1.31 | 3.26 | 0.49 | 32.73 |
| | 850 | 43.62 | 6.11 | 3.93 | | | | 2.62 | 2.62 | 3.49 | 1.31 | 4.26 | 0.81 | 25.15 |
| | 900 | 46.25 | 11.10 | 5.55 | | | | 4.16 | 4.39 | 7.86 | 3.70 | 6.34 | 0.73 | 43.83 |

Example 4

2-methyl-1-pentene was isolated from propylene dimer and utilized as feedstock for this example. Feed rates were 49.3 grams of hydrocarbon and 49.6 grams of steam per hour, giving a calculated space velocity of 0.564. Operating conditions were essentially the same as in Example 1. Data and results are tabulated following in Table IV. Optimum single pass yields of about 25 pounds aromatics per 100 pounds of 2-methyl-1-pentene were obtained.

Example 6

Propylene itself was processed in a like manner to that of the feedstock in Example 1. Feed rates were 54.8 grams of propylene and 50.1 grams of steam per hour,

TABLE IV

| Feed Stock | Operating Temp., °C. | Percent Liquid Recovery | Pounds Produced per 100 pounds Feedstock | | | | | | | | | | Total Aromatics, lb./100 lb. feed |
|---|---|---|---|---|---|---|---|---|---|---|---|---|---|
| | | | Liquid Phase | | | | | | | | Gas Phase | | |
| | | | Benz. | Tol. | m-Xylene | p-Xylene | o-Xylene | Styrene | Indene | Naphthalene | p-Methyl naphthalene | Benz. | Tol. | |
| 2-methyl-1-pentene. | 700 | 22.99 | 0.92 | 2.75 | 1.38 | 0.92 | 0.69 | | | 0.23 | | 0.55 | 0.16 | 7.60 |
| | 750 | 19.09 | 2.29 | 4.01 | 1.72 | 0.76 | 0.76 | 1.72 | | 0.48 | 0.38 | 2.33 | 0.87 | 15.32 |
| | 800 | 22.32 | 3.79 | 4.46 | | | | 2.46 | 1.45 | 1.90 | 0.67 | 4.79 | 1.33 | 20.85 |
| | 850 | 33.46 | 5.02 | 4.01 | | | | 3.01 | 2.51 | 4.35 | 1.34 | 4.45 | 0.61 | 25.30 |
| | 900 | 34.69 | 3.12 | 2.43 | | | | 1.73 | 1.04 | 7.63 | 1.91 | 5.80 | 0.51 | 24.17 |

Example 5

2,3-dimethylbutane (di-isopropyl) was processed in a similar manner for contrast. This compound is not a true propylene dimer in that no residual double bond remains, and it therefore resembles the branched chain aliphatics, of which it is a member. Feed rates were 51.7 grams of hydrocarbon and 50.8 grams of steam per hour, giving a calculated space velocity of 0.592. Optimum single pass yields of only 13.4 pounds aromatics per 100 pounds of 2,3-dimethylbutane were obtained. Complete data is tabulated following in Table V.

giving a calculated space velocity of 0.627. Optimum single pass yields of only 18 pounds of aromatics per 100 pounds of propylene fed were obtained. Data and results

TABLE V

| Feed Stock | Operating Temp., °C. | Percent Liquid Recovery | Pounds Produced per 100 pounds Feedstock | | | | | | | | | | Total Aromatics, lb./100 lb. feed |
|---|---|---|---|---|---|---|---|---|---|---|---|---|---|
| | | | Liquid Phase | | | | | | | | Gas Phase | | |
| | | | Benz. | Tol. | m-Xylene | p-Xylene | o-Xylene | Styrene | Indene | Naphthalene | p-Methyl naphthalene | Benz. | Tol. | |
| 2,3-dimethylbutane. | 700 | 38.22 | 0.38 | 0.38 | | | | | | | | 0.09 | | 0.85 |
| | 750 | 11.54 | | | | | | | | | | 1.27 | 0.42 | 1.69 |
| | 800 | 13.32 | 0.20 | 0.27 | | | | 0.40 | 0.27 | 0.40 | 0.13 | 3.24 | 0.58 | 5.49 |
| | 850 | 34.79 | 0.52 | 0.70 | | | | 0.87 | 0.70 | 1.57 | 0.52 | 4.05 | 0.53 | 9.46 |
| | 900 | 24.78 | 0.87 | 0.87 | | | | 1.61 | 0.50 | 1.98 | 0.62 | 6.27 | 0.53 | 13.42 | are presented following in Table VI. About one-half the yield of aromatics was realized as compared with the use of polypropylene hydrocarbons as feedstock.

TABLE VI

| Feed Stock | Operating Temp., °C. | Percent Liquid Recovery | Pounds Produced per 100 pounds Feedstock | | | | | | | | | | Total Aromatics, lb./100 lb. feed |
|---|---|---|---|---|---|---|---|---|---|---|---|---|---|
| | | | Liquid Phase | | | | | | | | Gas Phase | | |
| | | | Benz. | Tol. | m-Xylene | p-Xylene | o-Xylene | Styrene | Indene | Naphthalene | p-Methyl naphthalene | Benz. | Tol. | |
| Propylene | 700 | | | | | | | | | | | | | |
| | 750 | | | | | | | | | | | 0.05 | | 0.05 |
| | 800 | | | | | | | | | | | 0.55 | 0.04 | 0.59 |
| | 850 | 11.69 | 1.05 | 0.82 | | | | 1.40 | 1.58 | 1.75 | 0.53 | 3.62 | 0.44 | 11.19 |
| | 900 | 20.93 | 2.51 | 1.15 | | | | 1.36 | 1.36 | 2.93 | 1.05 | 6.97 | 0.71 | 18.04 |

We claim:

1. A process for converting polypropylene hydrocarbons to aromatic hydrocarbons consisting essentially of:
   (a) conducting a mixture of at least one polypropylene hydrocarbon and a gaseous diluent which is substantially inert to the reactants and reactant products as the reaction conditions through a reaction zone maintained at a temperature within the range of about 700° C. to about 950° C. and at a flow rate of from about 0.1 to about 2.0 grams of polypropylene hydrocarbon per milliliter of reaction zone per hour.

2. The process as defined in claim 1 and including the additional step of condensing the effluent gases evolved from said reaction zone and separating therefrom aromatic hydrocarbons and unreacted polypropylene hydrocarbons.

3. The process as defined in claim 1 and including the additional step of recycling unreacted polypropylene hydrocarbons through said reaction zone at said flow rate and temperature ranges.

4. The process as defined in claim 1 wherein the polypropylene hydrocarbon is a member of the group consisting of dimers, trimers, and tetramers of propylene and mixtures thereof.

5. The process as defined in claim 1 wherein the polypropylene hydrocarbon is 2-methyl-2-pentene.

6. The process as defined in claim 1 wherein the proportion of the diluent to the polypropylene hydrocarbon is within the range of from about 0.2:1 to about 1:1 by weight.

7. The process as defined in claim 1 wherein the diluent is steam.

References Cited

UNITED STATES PATENTS

| | | | |
|---|---|---|---|
| 2,404,056 | 7/1946 | Gorin et al. | 260—680 |
| 3,104,269 | 8/1963 | Schaffel | 260—680 |
| 3,283,024 | 11/1966 | Dulaney | 260—673.5 |

FOREIGN PATENTS

| | | |
|---|---|---|
| 862,709 | 11/1957 | Great Britain. |

DELBERT E. GANTZ, *Primary Examiner.*

J. D. MYERS, *Assistant Examiner.*